United States Patent
Ge (10) Patent No.: US 9,389,838 B2
(45) Date of Patent: Jul. 12, 2016

(54) METHOD FOR CREATING A COMPUTER SOFTWARE COMPILER FOR CLIENT SERVER COMPUTING

(71) Applicant: David Wei Ge, Kirkland, WA (US)

(72) Inventor: David Wei Ge, Kirkland, WA (US)

(73) Assignee: David Wei Ge, Kirkland, WA (US)

( * ) Notice: Subject to any disclaimer, the term of this patent is extended or adjusted under 35 U.S.C. 154(b) by 0 days.

(21) Appl. No.: 14/221,180

(22) Filed: Mar. 20, 2014

(65) Prior Publication Data

US 2015/0268938 A1    Sep. 24, 2015

(51) Int. Cl.
*G06F 9/44* (2006.01)
(52) U.S. Cl.
CPC ........................................ *G06F 8/37* (2013.01)
(58) Field of Classification Search
CPC .......................................................... G06F 8/37
USPC .......................................................... 717/108
See application file for complete search history.

(56) References Cited

U.S. PATENT DOCUMENTS

| 6,449,659 B1* | 9/2002 | Caron et al. | 719/315 |
| 8,615,750 B1* | 12/2013 | Iyer et al. | 717/159 |
| 8,914,774 B1* | 12/2014 | Colton et al. | 717/110 |
| 2003/0208640 A1* | 11/2003 | Just | G06F 9/548 |
| | | | 719/330 |
| 2013/0167128 A1* | 6/2013 | Iyer et al. | 717/143 |

* cited by examiner

*Primary Examiner* — Li B Zhen
*Assistant Examiner* — Sen Chen (57) ABSTRACT

This invention is related to a cross-client-server software compiler for defining a client server programming paradigm which removes boundary between client side programming and server side programming. By adopting the said programming paradigm a programmer does not explicitly distinguish client side programming and server side programming, and does not explicitly implement client server interactions. From human programming the said compiler identifies client side operations and server side operations, identifies client server communication requirements, identifies data upload and download requirements, identifies server states maintenance requirements, generates client code and server code, generates client server communications code for client server interactions to fulfill human programming.

7 Claims, 10 Drawing Sheets

| Human Programming | Computer Compiling | | | | | | |
|---|---|---|---|---|---|---|---|
| | operation type | data types | block | group | uploads | downloads | context |
| User input validation | client | client | | 1st | web page local time. email addresses. subject. email body | | |
| Create database record | server | client | | | | | |
| Send email | server | client | 1st | 2nd | | Email error | Database auto number |
| Update database record with email error | server | server | | | | | |
| Show email error on web page | client | server | | 3rd | | | |
| Update database record with web page time | server | client | 2nd | 2nd | page local time | | |

METHOD FOR CREATING A COMPUTER SOFTWARE COMPILER FOR CLIENT SERVER COMPUTING

TECHNICAL FIELD

Embodiments of the present invention relate to the field of computer software engineering. In particular, embodiments of this invention relate to creating software compiler for client server programming. In particular, embodiments of this invention relate to creating a new software compiler to define a new programming paradigm for automated client server data passing, context maintaining and code execution, thus the new programming paradigm hides the boundary between client and server from the programmers. In particular, the processes of the embodiments of the present invention create a compiler to identify client server communications requirements of human programming to be compiled, including data upload and download requirements, context data requirements, and generate client side and server side computer code, generate client server communication code for data and commands.

BACKGROUND ART

To execute human programming on a computer, a compiler or interpreter must be used to compile human programming into machine code. Hereafter compiler and interpreter are used as synonymous. The way a compiler works defines a specific programming paradigm for human programmers to do programming. A good programming paradigm makes programming intuitive, requires less coding, avoids programming pitfalls, and requires less technical knowledge of the programmers.

For example, a compiler with garbage collector takes the burden of memory allocation and de-allocation off from the human programmers. Java compiler and Microsoft .Net Framework compilers have garbage collectors. Programmers do not need to worry about memory management.

Another example is LINQ. Microsoft .Net Framework compilers enable SQL-like syntax into programming languages via LINQ. Programmers familiar with SQL could feel intuitive in mixing generic programming languages with SQL-like LINQ coding for database related programming.

There are many areas where various computer compilers make special efforts to make human programming easy and intuitive, such as artificial intelligence, graphics, etc.

A specific area the present invention is focusing is the client server programming. For example, in a web application environment, a web page runs at a client computer and interacts with a web server at a server computer. Client server communications are made via form submission or AJAX. State-of-art compilers and interpreters work for client programming or server programming, but not both. For example, a PHP interpreter only works with server programming, a JavaScript interpreter only works with client programming. Some languages, such as VB and C#, may be used at both client and server in some environments, but, despite syntax similarity, there is still a distinct boundary between client side programming and server side programming, that is, even had PHP and JavaScript used a similar syntax the programming boundary between client side programming and server side programming could not have gone away by unifying syntax. The programmers must write client side coding and server side coding separately, and address complex issues of making client side coding and server side coding work together.

Microsoft ASP.NET automates some aspects of client server programming. Its compiler generates server side code to match client side controls. It uses Auto-Post-back so that in handling some events form-submission is automatically done. It uses View State to automatically upload and download control properties. From a programmer's point of view it is as if a same control works at both client side and server side. Client server programming is thus made more intuitive.

SUMMARY OF INVENTION

Technical Problem

State-of-art computer compilers and interpreters work on client side programming or server side programming, but not on both. There is a distinct boundary between client side programming and server side programming. Programmers must code client programming and server programming separately and take care of interactions between client code and server code. Such separation of client server programming can be a burden to many programmers. It is also a place where programming defects and inefficiency is likely to occur.

Microsoft ASP.NET introduces an attribute "runat" for web controls to indicate that if a web control is a server control or not. If "runat" is "server" then the control is treated as a server control.

Microsoft ASP.NET uses Server Controls to help make client server programming more intuitive. To a programmer, it seems a client control lives at both client and server. Control properties are automatically uploaded to the server and downloaded to the client; client events, such as button click, become server events. Although the boundary between client and server still exists, the programming becomes more intuitive and convenient. Such convenience is not cheap, though. Suppose what a programmer wants to do is only to execute some server code at the event of a button click, then treating a client click event to be a server event is really convenient. But usually a programmer not only wants to execute server code but also wants to execute some client side code and some server side code in a desired sequence and conditions, according to various business requirements. ASP.NET provides remedies for such situations. For example programmers may use functions RegisterClientScriptBlock and RegisterStartupScript to insert client side coding when handling server events. Using such techniques correctly is not an easy issue. Automatic control properties uploading and downloading is also not cheap, web page can be slow down noticeably. Programmers may write code to fine tune ASP.NET View State storage, but it is a complex issue, and cannot be done right easily. According to an expert, the View State might slow down a web page for seconds and even minutes if it is not used properly (http://msdn.microsoft.com/en-us/library/ms972976.aspx). All such burdens are on the programmers.

Solution to Problem

The embodiments of the present invention provide processes for creating a computer compiler to hide complexity of client server programming from programmers. In a programming paradigm defined by the said computer compiler, programmers do client server programming without explicitly distinguish client side programming and server side programming; programmers never need to do programming to perform explicit client serve communications and client server interactions. The said compiler generates client side coding and server side coding from the programming of the programmers; the compiler identifies the needs of client server communications and generates required coding to perform client server communications; the said compiler identifies and generates codes for necessary data uploading and downloading; the said compiler identifies and generates necessary code for maintaining states for code executions in a stateless server, such as a web server.

The embodiments of the present invention provide processes for creating the said computer compiler by identifying client values and server values in human programming through an attribute associated with each property of an object, and breaking human programming into sequences of client operations and server operations through an attribute associated with each method, property and event of an object; by grouping operations into client operation groups and server operation groups; by grouping operation groups into operation blocks; by grouping operation blocks into execution contexts. A client operation group consists of a sequence of client operations; a server operation group consists of a sequence of server operations. An operation block consists of 3 operation groups, the first operation group is a client operation group involving only client values, the second operation group is a server operation group, and the third operation group is a client operation group. An execution context consists of a sequence of operation blocks. The said attribute is similar to the "runat" flag used in Microsoft ASP.NET; the difference is that the said attribute can be associated with each property, method and event of an object, not just associated with an object. The properties, methods and events of an object do not have to be associated with the said attribute; if an object is not associated with the said attribute then all its properties, methods and events not associating with the said attribute are considered run-at-server; if an object is associated with the said attribute then all its properties, methods and events not associating with the said attribute are considered to be associated with the said attribute associated with the object.

The embodiments of the present invention provide processes for creating the said computer compiler by identifying points of initiating client connection to server through such criteria: in each operation block, if the second operation group or the third operation group is not empty then a client to server communication code should be inserted at the end of the first operation group; the compiler compiles the second operation group to server side coding to be executed when the client to server communication is established; the said compiler generates code to be executed at the event when the client to server communication is finished, the code to be generated is the third operation group of the operation block and the next operation block in the same execution context.

The embodiments of the present invention provide processes for creating the said computer compiler by identifying data to be uploaded through collecting client values used in the second operation group of an operation block, the said compiler generates code at the end of the first operation group for establishing a connection from the client to the server and upload the client values to be used by the second operation group.

The embodiments of the present invention provide processes for creating the said computer compiler by identifying data to be downloaded through collecting server values used in the third operation group of an operation block, the said compiler inserts identified download data into the response returning from the server to client; the said compiler generates client side code to parse the response to get download data and present the download data to the client code generated from the third operation group.

The embodiments of the present invention provide processes for creating the said computer compiler by identifying context states to be maintained while compiling an operation block in an execution context for stateless server environments. The context states are common server values used by the operation block being compiled and the operation blocks following it. The said compiler adds the context states to upload and download values when generating client server communication code.

For web application programming, one possible embodiment of the present invention could be that to create a complete new running environment in web server and a complete new script language to run in web browsers. There is an issue of industry adoption. To help addressing this issue, the embodiments of the present invention provide processes for creating a framework for client server communications and executions. The said framework defines data and command formats in JSON for uploading data and commands from client to server; it defines data and commands formats in JSON for downloading data and commands from server to client. The said framework enables the said compiler to compile human programming into different client technologies and server technologies according to the choice of the programmer, while the programmer programs in the same programming language/paradigm defined by the said compiler. Unlike commonly seen frameworks such as the web services and client/server database engines, which are using one-way execution to send data and commands from client to server and get data from server to client, the said framework used in the present invention needs to be two-way executions by sending data and commands from client to server and from server to client, commands executions are at both the client and the server.

Advantageous Effects of Invention

By implementing the present invention, a cross client server compiler can be created to define a new client server programming paradigm. In the said new client server programming paradigm, there is not a boundary between client side programming and server side programming to a human programmer; programmers do not need to explicitly distinguish client side programming and server side programming; programmers do not need to write code to do client server communications and interactions; programmers do not need to write code to identify and maintain states during multiple client server interactions.

By adopting the said new client server programming paradigm, client server programming becomes easy, intuitive, efficient and less bug prone. It is easy because the client/server programming is done as if it is a standalone application programming. It is intuitive because the disappearing of client server boundary allows programmers to focus on implementing business logic instead of worrying about implementing client server interactions. It is efficient because the said compiler identifies necessary upload, download and state values, instead of blindly upload and download all form values or modified values. It is less bug-prone because the coding for client server interactions is generated by machine not by human programmers. Thus the new programming paradigm takes most of the client server programming complexity away from the human programming jobs.

BRIEF DESCRIPTION OF DRAWINGS

FIG. 7 shows a typical process for generating the first operation group in an operation block by a compiler implemented by the processes provided by this invention. A human programming operation is checked to see whether it belongs to the first operation group. If the programming operation is a server operation then it is the first operation of the second operation group, thus the first operation group is completed and the process of generating the second operation group starts. If the programming operation is a client operation and server values are used then it is the first operation of the third operation group, thus the first operation group is completed and the process of generating the third operation group starts. If the programming operation is a client operation and no server value is used then it belongs to the first operation group, thus it is added to the first operation group and the next human programming operation is processed.

DESCRIPTION OF EMBODIMENTS

Figure 6:
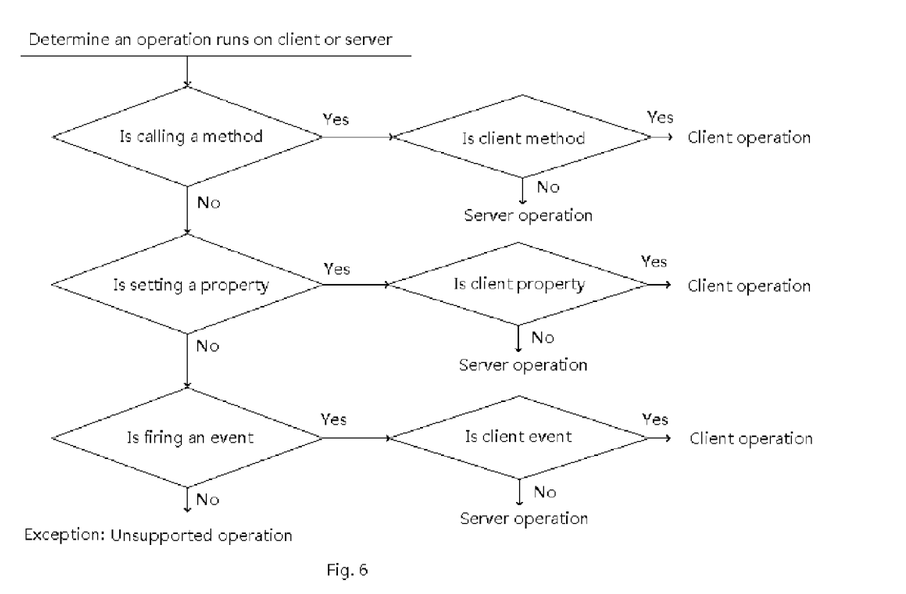
FIG. 6 shows a typical process for identifying whether a human programming operation is a client operation or a server operation by a compiler implemented by the processes provided by this invention.

One embodiment of this invention is by creating a cross client server compiler to define a new programming paradigm. The said programming paradigm adopts object-based programming paradigm, using objects as human programming entities. Object libraries are provided for programming; each object has properties, methods and events. Each object has attributes for the compiler to use, not for human programming use. Each property, method and event of an object has an attribute to indicate to the compiler whether it is for client side use or for server side use; such indicator is not for human programming. Referring to FIG. 6, a human programming operation is identified to be a client operation or a server operation, by the said compiler. Working in the said programming paradigm, a human programmer does programming in a similar way as doing standalone object-based programming, without separating client programming and server programming.

Figure 1:
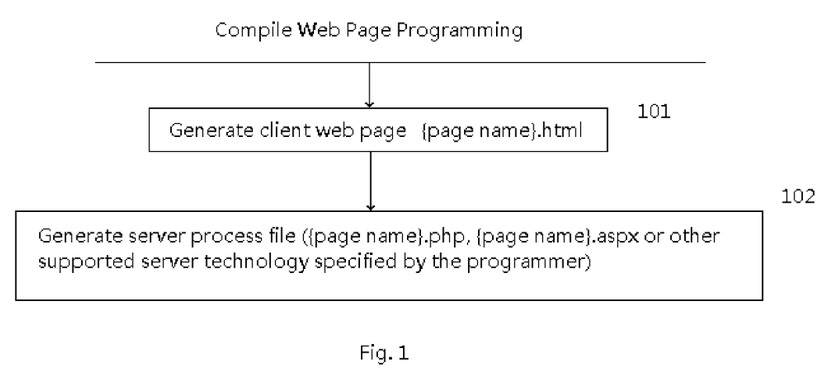
FIG. 1 shows a typical web page compiling process of a compiler implemented by the processes provided by this invention. The compiler generates a web client file for client coding and a web server file for server coding.

For web programming, one embodiment of this invention is by creating a cross client server compiler to compile each web page programming into two files: one client file and one server file. Referring to FIG. 1, the client file 101 is an HTML web page; the server file 102 can be a PHP file, an ASPX file or other types of server files depending on the choice of the programmer. The said compiler generates the client file and server files and supporting files, generates client coding in the client file and server side coding in the server file, generates necessary supporting files, and generates AJAX code or form submission code to perform client server interactions.

Figure 2:
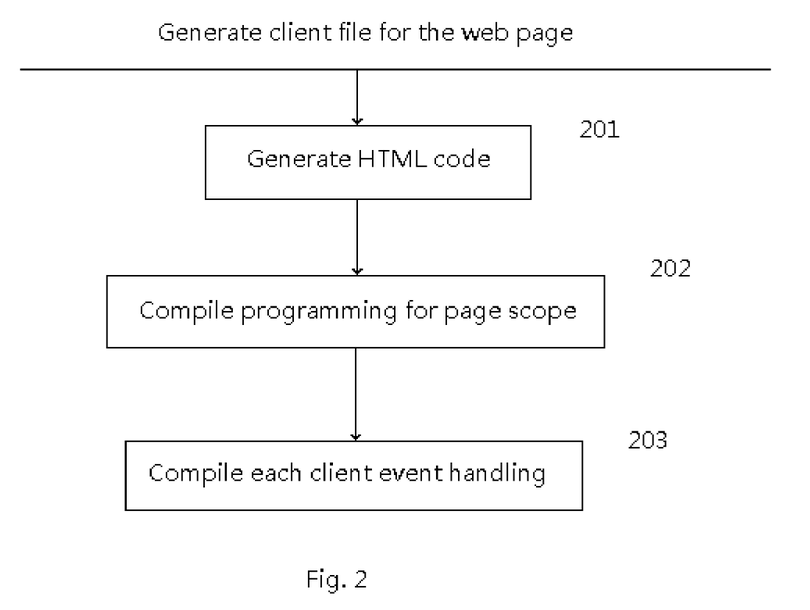
FIG. 2 shows a typical process for generating a web client file by a compiler implemented by the processes provided by this invention. The compiler generates HTML contents for the web client file. The compiler compiles human programming in each execution context. Page scope JavaScript is one execution context. Each client side event handler is one execution context.

One embodiment of this invention is by creating a cross client server compiler to compile human programming by generating HTML code for web application (201 in FIG. 2), by defining and compiling execution contexts, by using JavaScript technology for implementing client programming. The global JavaScript scope of the client web page is one execution context (202 in FIG. 2). Each client page event handling is one execution context (203 in FIG. 2). The said compiler compiles each execution context by grouping human programming in each execution context into operation blocks (1001 in FIG. 10). Every operation block consists of 3 operation groups. The first operation group consists of client operations involving only client values; the second operation group consists of server operations; the third operation group consists of client operations. Each operation group has 0 or more operations. The said compiler compiles each execution context by compiling each operation block in the execution context, starting with the first operation block (1002 in FIG. 10), linking the code for the next operation block to the end of the third operation group of the last operation block (1202 and 1203 in FIG. 12).

Figure 4:
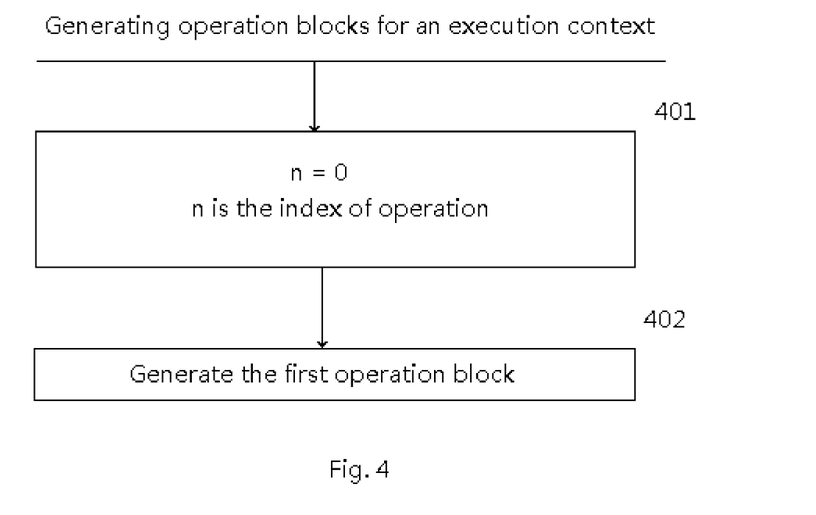
FIG. 4 shows a typical process for grouping human programming in an execution context by a compiler implemented by the processes provided by this invention. It starts by generating the first operation block and processing the first human programming operation in the execution context.
Figure 5:
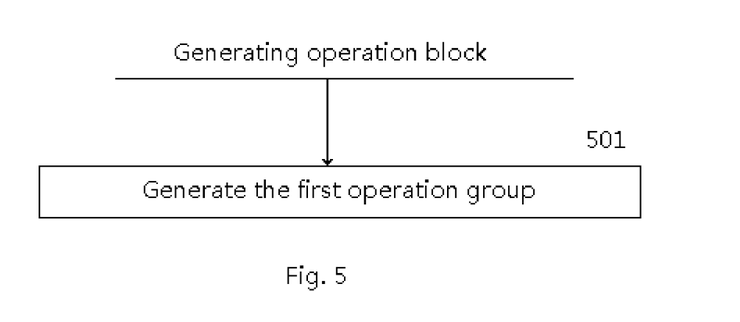
FIG. 5 shows a typical process for generating an operation block by a compiler implemented by the processes provided by this invention. It starts by generating the first operation group in the operation block.

One embodiment of this invention is by creating a cross client server compiler to compile human programming by grouping human programming in an execution context into operation blocks. Referring to FIG. 4, the grouping starts from the first human programming operation 401, and starts generating the first operation block 402. Referring to FIG. 5, grouping of an operation block starts by grouping the first operation group 501.

Figure 7:
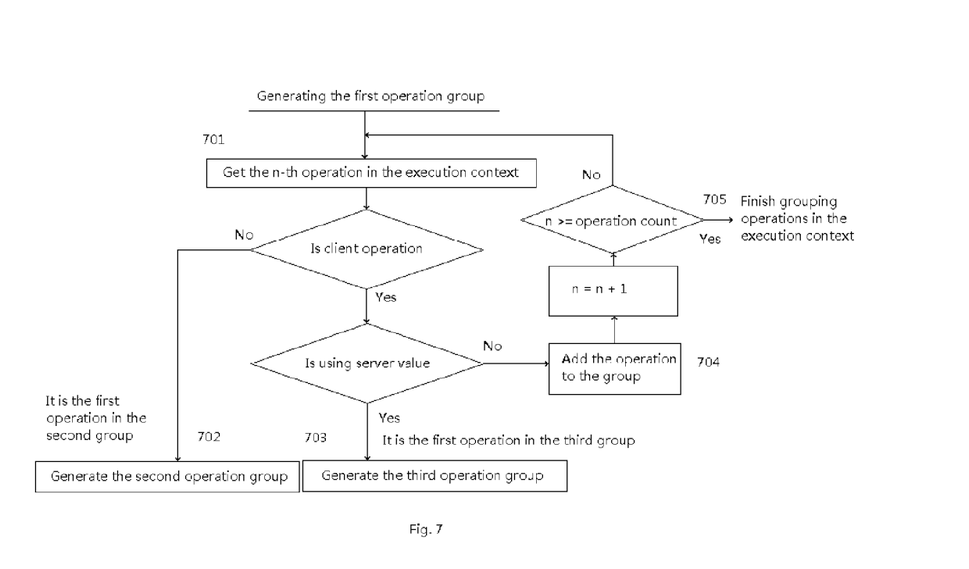

Referring to FIG. 7, the process of generating the first operation group starts by checking the n-th human programming operation in the execution context (701); if the n-th programming operation is not a client operation then the first operation group is completed and the process of generating the second operation group (702) starts; if the n-th programming operation is a client operation and it uses server values then the first operation group is completed and the process of generating the third operation group (703) starts; if the n-th programming operation is a client operation and it does not use server values then the n-th programming operation is added to the first operation group (704), n is increased by 1; if n is larger than or equal to the number of the programming operations in the execution context then the grouping of the execution context is completed (705), otherwise the process of generating the first operation group continues from 701.

Figure 8:
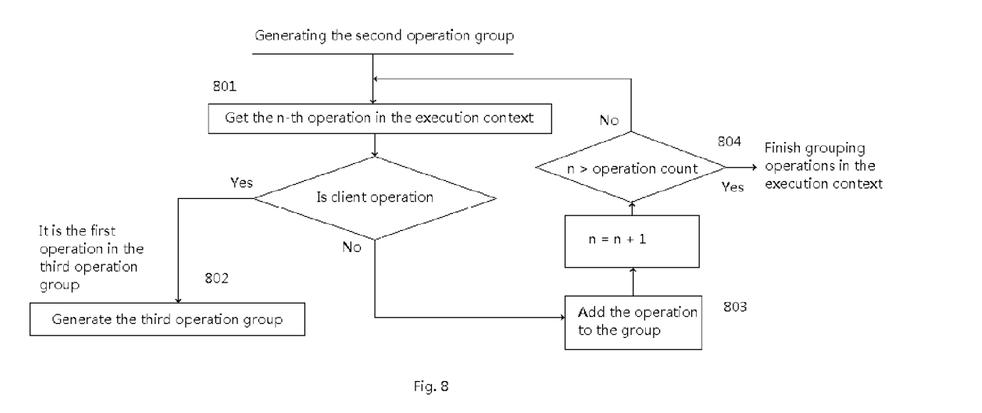
FIG. 8 shows a typical process for generating the second operation group in an operation block by a compiler implemented by the processes provided by this invention. A human programming operation is checked to see whether it belongs to the second operation group. If the programming operation is a client operation then it is the first operation of the third operation group, thus the second operation group is completed and the process of generating the third operation group starts. If the programming operation is a server operation then it belongs to the second operation group, thus it is added to the second operation group and the next human programming operation is processed.

Referring to FIG. 8, the process of generating the second operation group starts by checking the n-th human programming operation in the execution context (801); if the n-th programming operation is a client operation then the second operation group is completed and the process of generating the third operation group (802) starts; if the n-th programming operation is not a client operation then the n-th programming operation is added to the second operation group (803), n is increased by 1; if n is larger than or equal to the number of the programming operations in the execution context then the grouping of the execution context is completed (804), otherwise the process of generating the second operation group continues from 801.

Figure 9:
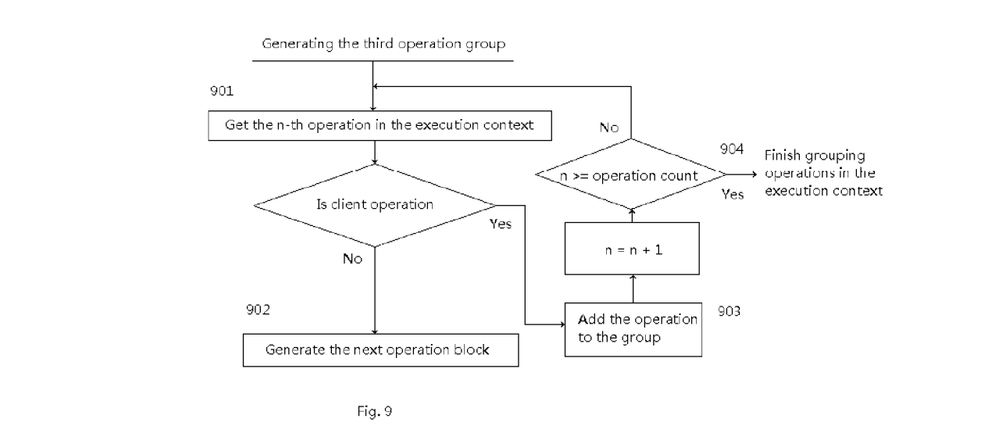
FIG. 9 shows a typical process for generating the third operation group in an operation block by a compiler implemented by the processes provided by this invention. A human programming operation is checked to see whether it belongs to the third operation group. If the programming operation is a server operation then it belongs to the next operation block, thus the third operation group is completed and the process of generating the next operation block starts. If the programming operation is a client operation then it belongs to the third operation group, thus it is added to the third operation group and the next human programming operation is processed.

Referring to FIG. 9, the process of generating the third operation group starts by checking the n-th human programming operation in the execution context (901); if the n-th programming operation is not a client operation then the third operation group is completed and the process of generating the next operation block (902) starts, which is the process shown in FIG. 5; if the n-th programming operation is a client operation then the n-th programming operation is added to the third operation group (903), n is increased by 1; if n is larger than or equal to the number of the programming operations in the execution context then the grouping of the execution context is completed (904), otherwise the process of generating the third operation group continues from 901.

Figure 3:
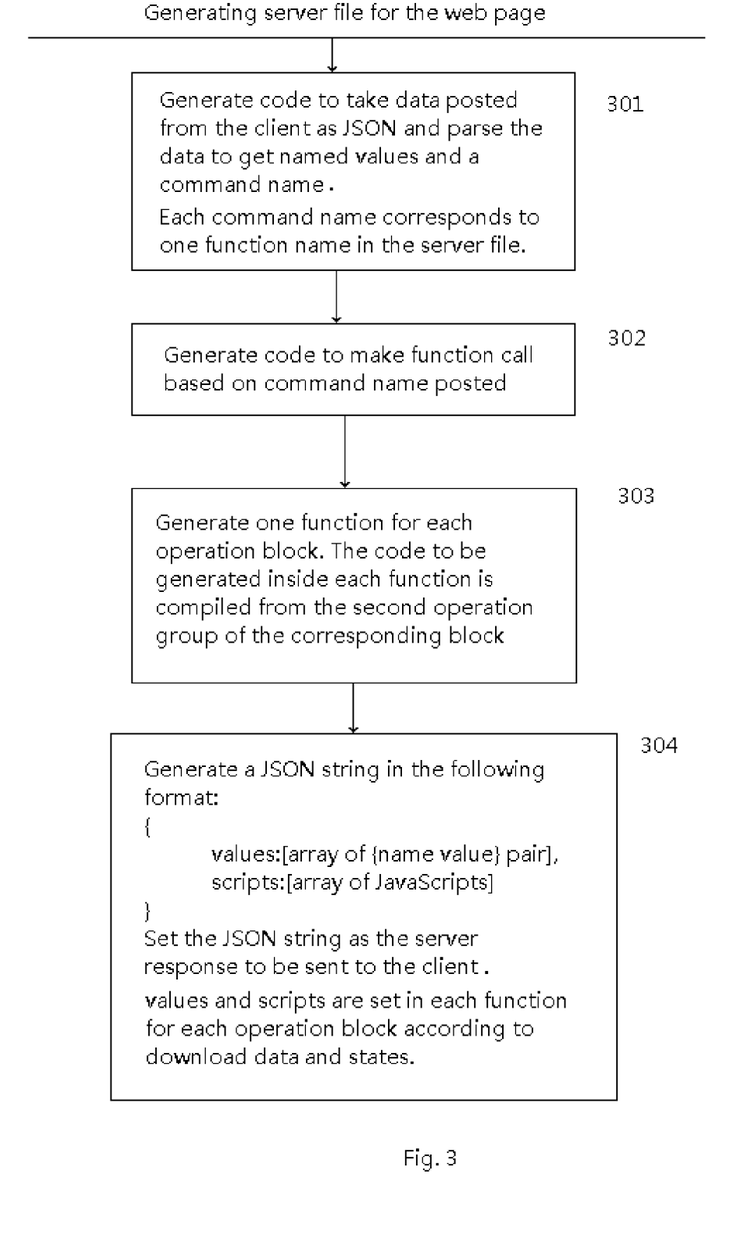
FIG. 3 shows a typical process for generating a server file by a compiler implemented by the processes provided by this invention. Each operation block has one corresponding function in the server file, which is compiled from its second operation group. The server file parses client request to get uploaded values and a command name identifying the operation block making the client request. The function corresponding to the command name is executed. Server response is formed by data to be downloaded to the client side and scripts to be executed at the client side.
Figure 11:
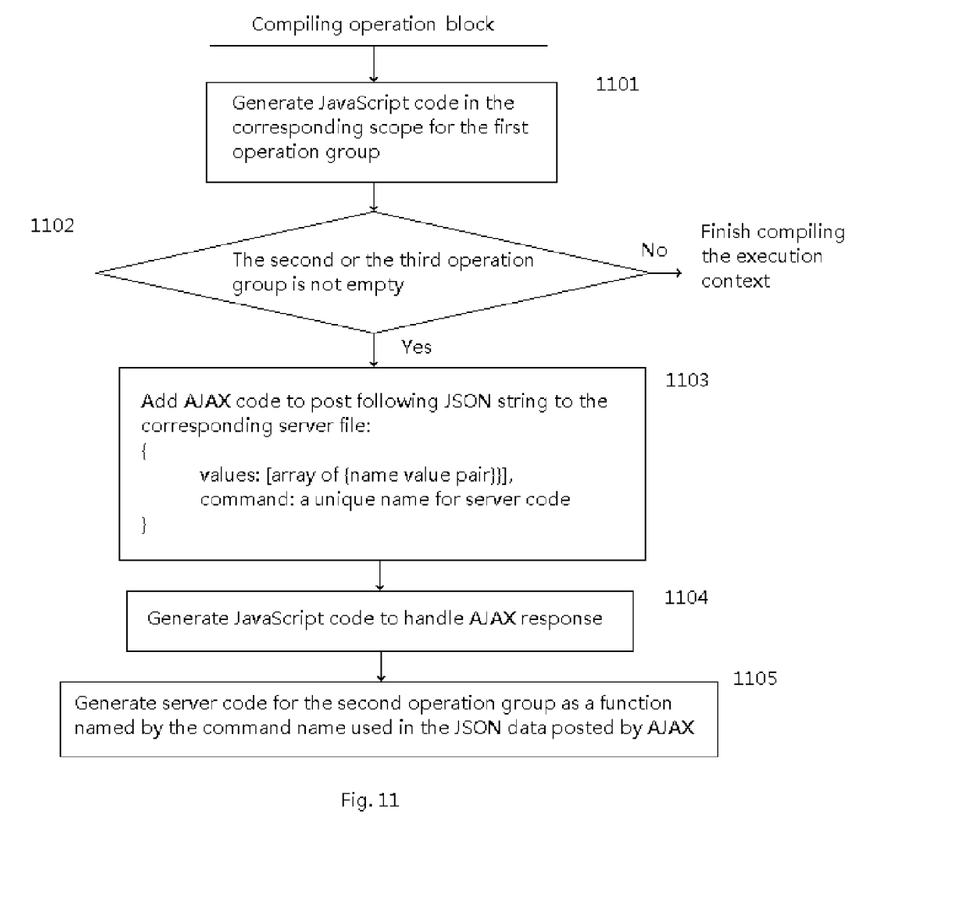
FIG. 11 shows a typical process for compiling an operation block by a compiler implemented by the processes provided by this invention. It generates JavaScript code for the first operation group in the operation block; it generates AJAX code to invoke code for the second operation group; it generates AJAX response handler.

One embodiment of this invention is by defining a client server communication framework using JSON format (1103 in FIGS. 11 and 304 in FIG. 3). The said framework makes it possible for the said compiler to support various existing client technologies and server technologies. For example some existing client programming technologies include JavaScript, VB Script, etc.; some existing server technologies widely adopted in web servers include PHP, ASPX, etc. The said framework enables different server technologies to handle the same client requests and different client technologies to handle the same server responses. Human programmers carry out programming jobs in a programming paradigm without client/server distinguishing; the said compiler generates client coding and server coding using a supported client technology and a supported server technology. If the said compiler supports multiple client technologies and server technologies then the said compiler may give human programmers options to specify the client or server technology for the compiling work.

Figure 12:
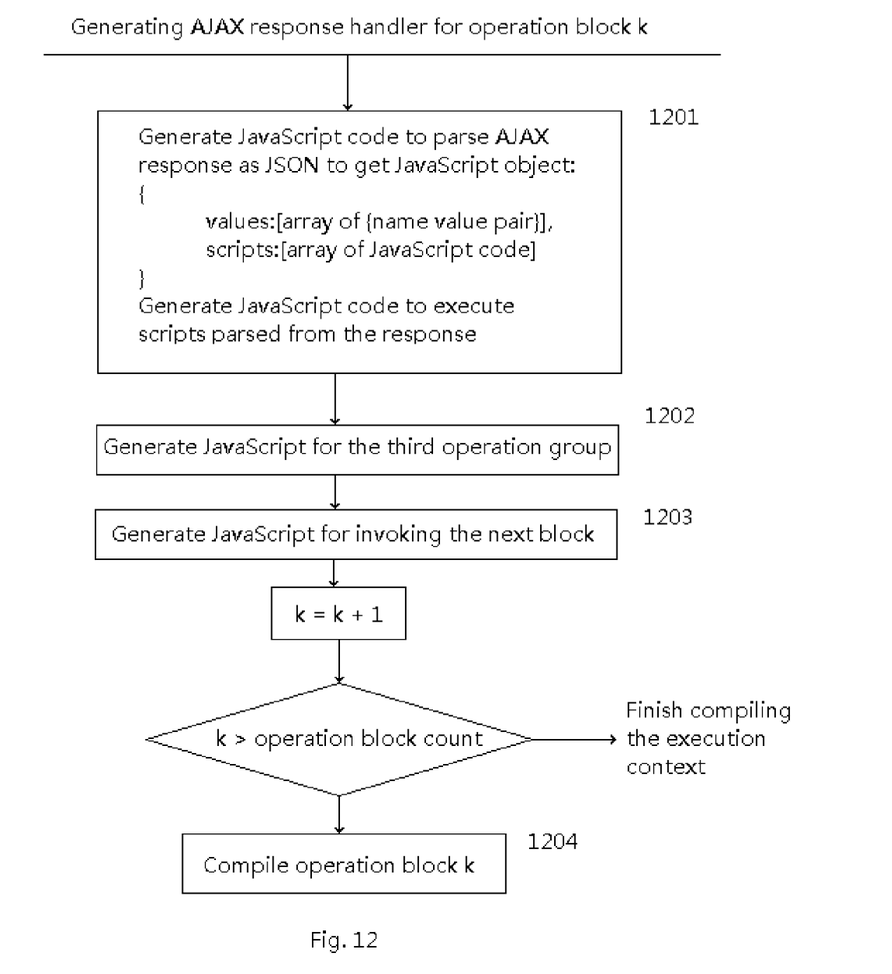
FIG. 12 shows a typical process for generating AJAX response handler by a compiler implemented by the processes provided by this invention. The handler parses the server response to get download values and client scripts. The human programming operations in the third operation group are compiled into the handler. The handler also invokes the code compiled from the next operation block.

One embodiment of this invention is by creating a compiler to compile an operation block in an execution context by generating JavaScript code in the client web page for the first operation group (1101 in FIG. 11); identifying upload values by collecting client values used in the second operation group; identifying download values by collecting server values used in the third operation group; identifying context states by collecting common server values used in the operation block to be compiled and the operation blocks following it in the same execution context; by generating AJAX code (1102 and 1103 in FIG. 11) at the end of the first operation group to connect to the server file (102 in FIG. 1) corresponding to the client web page (101 in FIG. 1), the data to be sent to the server include upload values, context states, and a command name identifying the corresponding server code to be executed (1103 in FIG. 11); by generating server side coding to parse client request (301, 302 in FIG. 3) to get uploaded values, context states and a command name identifying the operation block making the client server connection; by generating server side coding to execute server side code based on the command name identifying the operation block making the client server connection (302 in FIG. 3); by generating server side coding (303 in FIG. 3) for the second operation group (1105 in FIG. 11, 1301, 1302 in FIG. 13), in PHP code, in Microsoft .Net Framework DLL, in Java Servlet, or in other server technologies supported by the said compiler and selected by the programmer, the server code is generated under the command name (i.e. function name) specified in the AJAX code (1103 in FIG. 11) so that once the server file is connected the server code for the second operation group will be executed; by generating server code to form server response to the client (304 in FIG. 3, 1302 in FIG. 13), the response is in JSON format, the response includes download values, context states, and JavaScript to invoke the code for the third operation group; by generating JavaScript code to handle the server response (1104 in FIG. 11), parse the server response to get download values, context states and JavaScript code to be executed (1201 in FIG. 12); by generating JavaScript code for the third operation group and arrange the JavaScript code to be executed after handling the server response (1202 in FIG. 12); by compiling the next operation block (1204 in FIG. 12) and arrange the code for the next operation block to be executed after the execution of the third operation group (1203 in FIG. 12).

Example 1

Source code—file name: CodeCompiler_cs.txt, line numbers: 10167-10585. The file contains part of source code for a compiler of a codeless programming system. For the web project compilation the compiler uses the technologies presented by this invention. The said compiler is in C#. The lines 10167-10585 define a function for compiling web client event handling. Except line 10546, most of the lines in this function are for compiling global JavaScript scope of the client web page as one execution context (202 in FIG. 2). Line 10546 is calling a function for compiling each client page event handling as one execution context (203 in FIG. 2).

Example 2

Source code—file name: CodeCompiler_cs.txt, line numbers: 8534-10017. The lines define a function named createWebClientHandler. The function compiles one client page event handling as one execution context (203 in FIG. 2).

Figure 10:
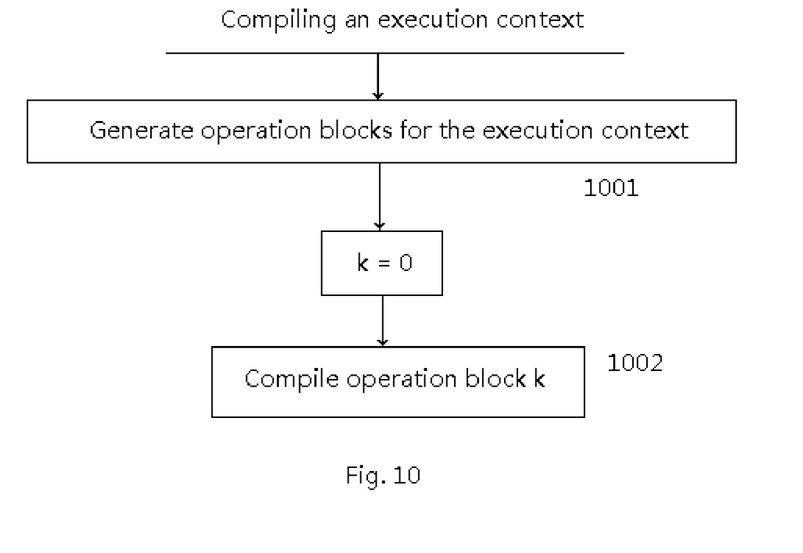
FIG. 10 shows a typical process for compiling an execution context by a compiler implemented by the processes provided by this invention. It first generates operation blocks from the human programming; it then compiles from the first operation block.

Line 8968 calls a function to group human programming into operation blocks (1001 in FIG. 10). Variable actList holds a list of operation blocks generated by line 8968.

For easier explaining the new technology presented by this invention, FIG. 10, FIG. 11 and FIG. 12 show a process of compiling operation blocks starting from block 1 and sequentially to the last block. For easier C# implementation, lines 8989 to 9965 compile the operation blocks starting from the last block and sequentially to the first block. Since the C# implementation needs to generate code for one operation block to invoke the execution of the next operation block, compiling the next operation block first makes the code for the next operation block available for the previous operation block to invoke it and thus it is easier to implement, because the compiling of each operation block one by one becomes a tail-recursion. But this is just an example of implementing the present invention. Another example of implementing the present invention by compiling from block 1 and sequentially to the last block is also possible.

Lines 9015 and 9017 collect upload values (1103 in FIG. 11). Lines 9019 to 9044 collect download values (1302 in FIG. 13).

In the operation block list each operation block object has 3 operation groups. In this example these 3 operation groups are implemented via 3 properties: Sect0, Sect1 and Sect2; they represent the first operation group, the second operation group and the third operation block, respectively.

Lines 9049 to 9215 compile the first operation group in an operation block (1101 in FIG. 11).

Lines 9217 to 9258 prepare upload values as {name value} pairs to be uploaded (1103 in FIG. 11).

Line 9262 creates a server function name (1103 in FIG. 11) to be used for creating code for the second operation group (1301 in FIG. 13); this name is also serves as an identifier to the operation block.

Figure 13:
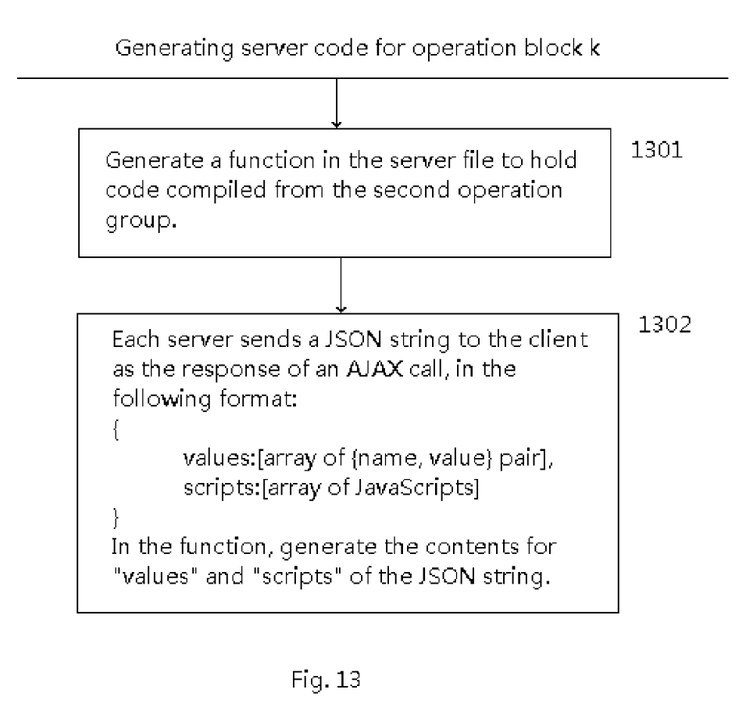
FIG. 13 shows a typical process for generating code for the second operation group in an operation block by a compiler implemented by the processes provided by this invention. The second operation group is compiled to a function in the server file. The function also contains code for setting download values and client scripts.

Lines 9300-9510 compile the second operation group (1301 in FIG. 13, 1105 in FIG. 11). For this example, it supports two existing server technologies: ASPX and PHP. Depending on the preference of the developer, .Net Framework DLL is created or PHP code is generated for the second operation group.

Lines 9569-9588 connect the code for the next block to the current block (1203 in FIG. 12).

Lines 9644 and 9645 generate AJAX call for executing the second operation group (1103 in FIG. 11).

Lines 9666-9762 generate code for server response to client. The server response is formed by an array of {name value} pairs and JavaScript code to be executed (1302 in FIG. 13).

Lines 9766-9906 generate code for the third operation group (1202 in FIG. 12).

Lines 9910-9941 put together the code for the second operation group into a server function (1105 in FIG. 11, 1301 in FIG. 13).

Example 3

Source code—file name: EventAction_cs.txt, lines 1046-1417 define a function named CreateWebClientHandlerActionBlocks. The function is for grouping human programming for one web client event handling into a list of operation blocks (1001 in FIG. 10). The function also supports form submission for file-upload and web page dialogue; these features are not included in the claims of this invention.

Line 1052 creates the first operation block (FIG. 4).

Lines 1054 to 1301 go through each event handling action to group actions into operation groups and blocks.

Line 1151 checks action type to determine the action is a client action or a server action (FIG. 6).

Lines 1162 to 1241 are grouping event handler actions (1001 in FIG. 10); lines 1242 to 1270 are for supporting web page dialogue, this feature is not included in the claims of this invention; lines 1271 to 1295 are for supporting web form submission for file-upload, this feature is not included in the claims of this invention.

Line 1169 adds the action to the first operation group (704 in FIG. 7).

Lines 1172 and 1173 start generating the third operation group (802 in FIG. 8).

Line 1176 adds the action to the third operation group (903 in FIG. 9).

Lines 1185 and 1186 start generating the second operation group (702 in FIG. 7).

Line 1189 adds the action to the second operation group (803 in FIG. 8).

Lines 1192 to 1196 finish generating the current operation block and start generating the next operation block (902 in FIG. 9).

Lines 1228 and 1229 start generating the third operation group (703 in FIG. 7)

Lines 1232 and 1233 start generating the third operation group (802 in FIG. 8)

Line 1236 adds the action to the third operation group (903 in FIG. 9).

Example 4

Source code—file name: jsonDataBind_js.txt, lines 3210-3212 define a function named executeServerMethod. The function is used to make a client to server connection. json-DataBind_js.txt is part of JavaScript code for implementing a client-to-server framework. It is to be used in compiler generated code for making client-to-server connection. It calls a function named _executeServerCommands.

Source code—file name: jsonDataBind_js.txt, lines 2789-2835 define a function named _executeServerCommands. The function is used to make a client to server connection. Variable req holds upload values and server commands (1103 in FIG. 11).

Source code—file name: jsonDataBind_js.txt, lines 2681-2788 define a function named _callServer. The function is used to make a client to server connection by AJAX or by form submission. Server response is handled by a function named _processServerResponse.

Source code—file name: jsonDataBind_js.txt, lines 2468-2679 define a function named _processServerResponse. The function is used to handle server response from AJAX or form submission. Line 2535 converts server response to JavaScript objects defined by a server-to-client framework (1201 in FIG. 12). Line 2620 executes client scripts downloaded from the server; the scripts include invoking the code compiled from the third operation group (1202 in FIG. 12). Line 2652 invokes the code compiled from the next operation block (1203 in FIG. 12).

Example 5

Source code—file name: JsonProcessPage_php.txt, lines 57-756 define a class named JsonProcessPage. It is part of a client-to-server framework and a server-to-client framework. It parses the client requests (Line 629, 301 in FIG. 3); executes server code (Line 730, 302 in FIG. 3); forms server responses (Lines 161-171, 304 in FIG. 3).

Example 6

Figure 14:
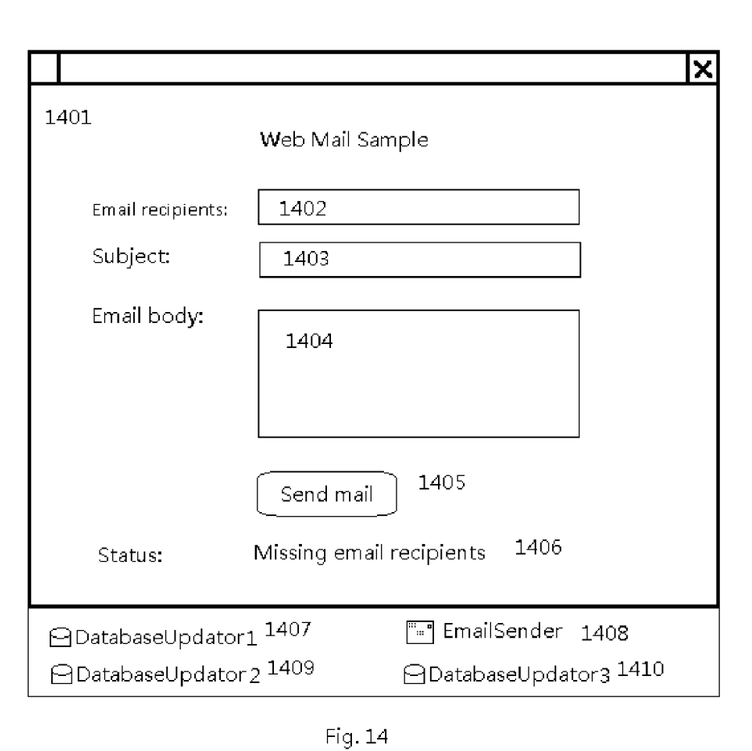
FIG. 14 shows a sample web page 1401 to be programmed by human programmers. A text box 1402 is used for entering email recipients. A text box 1403 is used for entering email subject. A text area 1404 is used for entering email body. A button 1405 is used for invoking email sending. A label 1406 is used to show validation result and email sending status. A database updater component 1407 is used for recording email parameters. An email sending component 1408 is used for sending emails. A database updater 1409 is used for saving email sending result or error message. A database updater 1410 is used for saving the web page local time when the email sending ends.

FIG. 14 shows a web page (1401) sample. A text box 1402 is used for entering email addresses; a text box 1403 is used for entering email subject; a text area 1404 is used for entering email body; a button 1405 is used for triggering the sending of an email; a label 1406 is used for showing validation errors and email sending errors; database updater 1407 is used to insert a database record for the email to be sent; email sender 1408 is used to send emails; database updater 1409 is used to update the database record to record email sending error messages; database updater 1410 is used to update the database record to record the web page local time indicating the ending of the email operation.

Figure 15:
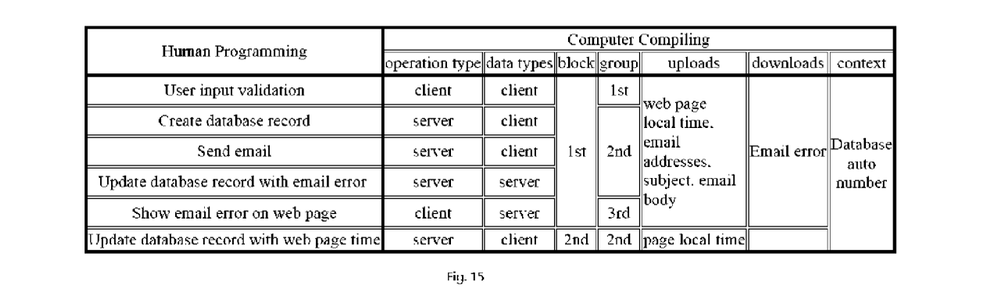
FIG. 15 shows a human programming for the email-sending web page shown in FIG. 14. It also shows the compiling process of a compiler implementing the present invention. The first column shows human programming; the second column shows the operation type identified by the said compiler; the third column shows data types used in the operations; the fourth column shows the blocks identified by the said compiler; the fifth column shows the operation groups identified by the said compiler; the sixth column shows the upload values identified by the said compiler; the seventh column shows download values identified by the said compiler; the last column shows context values identified by the said compiler.

FIG. 15 shows a human programming for the web page shown in FIG. 14. It also shows compiling results of a compiler implementing the present invention. The human programming "User input validation" is a client operation and uses client values only, thus it belongs to the first operation group (704 in FIG. 7). The human programming "Create database record", "Send email", and "Update database record with email error" are server operations, thus they belong to the second operation group (803 in FIG. 8). The human programming "Show email error on web page" is a client operation, since it is after an operation in the second operation group it belongs to the third operation group (802 in FIGS. 8 and 903 in FIG. 9). The human programming "Update database record with web page time" is a server operation, since it is after an operation in the third operation group it belongs to the second operation group (803 in FIG. 8) of the next operation block (902 in FIG. 9).

FIG. 15 shows that the upload values for the first operation block are email recipients, email subject, email body and the web page local time, because those are the client values used in the second operation group of the first operation block. The first operation block has one value to be downloaded; it is the error message for email sending. The second operation block has one upload value; it is the web page local time. The second operation block does not use download values. There is one context state value for this event handling: the database auto number for the new record saving the email parameters. This auto number is used in operations "Update database record with email error message" and "Update database record with web page time", making this auto number a common server value used in both operation blocks, thus making it a context state value.

Compiler generated source code—file names: Page1_html.txt and Page1_css.txt (101 in FIG. 1); Page1_php.txt (102 in FIG. 1).

Compiler generated source code—file name: Page1_html.txt, lines 50-75. The compiler implementing the present invention generates lines 50-75 as the results of compiling human programming for handling onclick event of a button for triggering sending email. The human programming is presented in the first column of a table in FIG. 15. Lines 58-61 are the generated code for the first operation group of the first operation block (1101 in FIG. 11). Lines 62-66 and 74 are the generated code for posting upload values and command name for invoking the code for the second operation group (1103 in FIG. 11). Line 63 is for uploading local time; line 64 is for uploading email subject; line 65 is for uploading email addresses; line 66 is for uploading email body. Note that it generates a command name, s649669a0, at line 74 for the code of the second operation group. Lines 67-73 are code generated for the second operation block (1204 in FIG. 12).

Compiler generated source code—file name: Page1_php.txt, lines 103-164. The said compiler generates the code for the second operation group of the first operation block (1105 in FIGS. 11 and 1301 in FIG. 13). Line 161 sets the email sending error message as a download value; line 162 sets the auto number for the new database record as a download value because it is a context state value; line 163 sets a JavaScript code to be executed after returning to client (1302 in FIG. 13), it is for invoking the code for the third operation group of the first operation block (1202 in FIG. 12).

Compiler generated source code—file name: Page1_html.txt, lines 78-80. The said compiler generates the code for the third operation group (1202 in FIG. 12). The invoking of this code is compiled in Page1_php.txt, line 163.

Compiler generated source code—file name: Page1_html.txt, lines 67-73. The said compiler generates the code for invoking the next operation block (1203 in FIG. 12). Upload value named j97cb746d at line 69 is for the database auto number because it is identified by the said compiler as a context state value; upload value je0817c19 at line 71 is for the web page local time. Both values are needed for the second operation group of the second operation block. Line 72 shows that the command name for the second operation group is s98382d41 (1103 in FIG. 11).

Compiler generated source code—file name: Page1_php.txt, lines 78-102. The said compiler generates the code for the second operation group of the second operation block (1105 in FIGS. 11 and 1301 in FIG. 13).

Compiler generated source code—file name: Page1_php.txt, lines 73-77. The said compiler generates the code for invoking the execution of a function corresponding to an operation block identified by variable $method (302 in FIG. 3). In this example, the said compiler generates 2 operation blocks identified by function names s98382d41 and s649669a0. Function s649669a0 represents the first operation block; function s98382d41 represents the second operation block.

INDUSTRIAL APPLICABILITY

One area of client server programming is the world wide web programming for building web sites and web applications. All web site and web application developers may benefit from the present invention. Developers for intranet applications may also benefit from the present invention.

Programming for a peer-to-peer network environment may also benefit from the present invention, where each computer acts as both a client and as a server.

Cloud computing may benefit from the adoption of this invention due to the advantages explained in the section "Advantageous Effects of Invention".

Embodiments of present invention show these and other advantages. Those skilled in the art may make variations and modifications to the above embodiments based on concepts of present invention. Those skilled in the art may implement the concepts of present invention in various programming languages. This invention is not limited to particular embodiments, but includes all implementations making use of concepts disclosed in specification, embodiments, drawings and claims of present invention.

The invention claimed is:

1. A method for creating a cross-client-server software compiler to take over the client-server related software programming work, including generating client coding and server coding from human programming, generating code for performing client-server connections, data exchanges and interactions, and generating code for maintaining server states; said method further comprising of a process of grouping human programming into client operation groups and server operation groups, grouping human programming into operation blocks, and grouping human programming into execution contexts; a client operation group consists of an ordered list of client operations; a server operation group consists of an ordered list of server operations; an operation block consists of 3 operation groups, the first operation group is a client operation group involving only client values, the second operation group is a server operation group, and the third operation group is a client operation group; an execution context consists of an ordered list of operation blocks for one execution unit; said method further comprising of a process of grouping human programming in an execution context into an ordered list of operation blocks; the process starts by generating the first operation block, generating the first operation group of the first operation block and by processing the first human programming operation to determine whether the programming operation belongs to the first operation group or it belongs to the second or the third operation group of the operation block; said method further comprising of a process of compiling an execution context; the compiling of the said execution context is done by compiling each operation block of the execution context one by one; said method further comprising of a process of compiling an operation block by generating client computer coding for the first operation group; by identifying upload values by collecting client values used in the second operation group; by identifying server states by collecting common server values used in the operation block to be compiled and the next operation blocks in the same execution context; by identifying the need of a client server communication by checking that the second or the third operation group in the operation block is not empty; by generating client server connection code to send upload values, server states and a command name identifying the operation block; by generating a client event handler to handle the response of the client server communication.

2. The method of claim 1, further comprising of a process of creating a programming paradigm to hide client-server related programming work from human programmers by providing a standard object library; each object in the said library have properties, methods and events; each property, method and event is associated with an attribute to indicate to the said compiler that a human programming operation (a method call, setting a property, or firing an event) is a client operation or a server operation; the said attribute on a property also indicates that the property is a server value or a client value.

3. The method of claim 1, further comprising of a process of generating the first operation group of an operation block; if the programming operation to be processed is a server operation then the first operation group is completed and a process of generating the second operation group starts from the programming operation to be processed; if the programming operation is a client operation and server values are used by the programming operation then the first operation group is completed and a process of generating the third operation group starts from the programming operation to be processed; if the programming operation is a client operation and no server value is used by the programming operation then the programming operation is added to the first operation group, and the process defined by this claim is used to process the next programming operation in the execution context if the programming operation is not the last operation, if the programming operation is the last operation then the grouping of the programming operations in the execution context finishes.

4. The method of claim 1, further comprising of a process of generating the second operation group of an operation block; if the programming operation to be processed is a client operation then the second operation group is completed and a process of generating the third operation group starts from the programming operation to be processed; if the programming operation is a server operation then the programming operation is added to the second operation group, and the process defined by this claim is used to process the next programming operation in the execution context if the programming operation is not the last operation, if the programming operation is the last operation then the grouping of the programming operations in the execution context finishes.

5. A method according to claim 1, further comprising of a process of generating the third operation group of an operation block; if the programming operation to be processed is a server operation then the third operation group is completed and the operation block to be generated is completed, a next operation block is generated, and the process for generating the first operation group in an operation block defined by claim 1 is used to process the next programming operation in the execution context; if the programming operation is a client operation then the programming operation is added to the third operation group, and the process defined by this claim is used to process the next programming operation in the execution context if the programming operation is not the last operation, if the programming operation is the last operation then the grouping of the programming operations in the execution context finishes.

6. The method of claim 1, further comprising of a process of generating server code to be executed when a client server communication is established and the communication is established for the operation block to be compiled; the server code is compiled from the second operation group of the operation block to be compiled; the server code is generated under an unique name identifying the operation block to be compiled; download values are identified by collecting the server values used in the third operation group of the operation block to be compiled; server response is formed by the download values, the server states and client scripts to be executed at client side.

7. The method of claim 1, further comprising of a process of generating a client event handler to handle the response of the client server communication by generating code to parse server response to get the download values, the server states and client scripts; by generating code to invoke the client scripts downloaded; by generating client code from the third operation group of the operation block to be compiled; by generating client code to invoke the client code compiled from the third operation group; by generating client code to invoke the code compiled for the next operation block in the same execution context.

* * * * *